(12) United States Patent
Thompson

(10) Patent No.: US 7,679,902 B2
(45) Date of Patent: Mar. 16, 2010

(54) VERTICAL DOCKING STATION

(76) Inventor: Eric Thompson, 14206 SE. 165th Pl., Renton, WA (US) 98058

( * ) Notice: Subject to any disclaimer, the term of this patent is extended or adjusted under 35 U.S.C. 154(b) by 1035 days.

(21) Appl. No.: 10/515,907

(22) PCT Filed: May 22, 2003

(86) PCT No.: PCT/US03/16418

§ 371 (c)(1),
(2), (4) Date: Nov. 26, 2004

(87) PCT Pub. No.: WO03/103357

PCT Pub. Date: Dec. 11, 2003

(65) Prior Publication Data

US 2005/0162824 A1 Jul. 28, 2005

Related U.S. Application Data

(60) Provisional application No. 60/383,964, filed on May 28, 2002.

(51) Int. Cl.
*G06F 1/16* (2006.01)
(52) U.S. Cl. .......................... 361/679.44; 361/679.47; 710/303; 710/304
(58) Field of Classification Search ................ D14/315, D14/439–441; 361/686, 679.44
See application file for complete search history.

(56) References Cited

U.S. PATENT DOCUMENTS

| | | | | |
|---|---|---|---|---|
| 5,822,185 A | * | 10/1998 | Cavello | 361/686 |
| 6,251,493 B1 | * | 6/2001 | Johnson et al. | 428/71 |
| 6,256,193 B1 | * | 7/2001 | Janik et al. | 361/683 |
| D462,890 S | * | 9/2002 | Brown | D8/356 |
| 6,489,745 B1 | * | 12/2002 | Koreis | 320/108 |
| 6,545,864 B2 | * | 4/2003 | Davis, IV | 361/683 |
| 6,583,984 B2 | * | 6/2003 | Yin et al. | 361/686 |
| 6,643,127 B1 | * | 11/2003 | Richardson | 361/686 |
| 6,906,495 B2 | * | 6/2005 | Cheng et al. | 320/108 |
| 2002/0080572 A1 | * | 6/2002 | McKnight | 361/685 |
| 2003/0042740 A1 | * | 3/2003 | Holder et al. | 290/1 A |
| 2003/0075670 A1 | * | 4/2003 | Tuominen | 250/205 |
| 2004/0149863 A1 | * | 8/2004 | Jelinger | 248/68.1 |
| 2004/0190238 A1 | * | 9/2004 | Hubbard | 361/683 |

* cited by examiner

*Primary Examiner*—Jayprakash N Gandhi
*Assistant Examiner*—Anthony Q Edwards

(57) ABSTRACT

A docking station, serving as a digital hub and cable management platform, support a laptop computer (42) in an upright position with the laptop screen (43) in a comfortable viewing position relative to the working position of the user. The laptop (42) is positioned in an upright slot (4) in the docking station, with the connection ports easily seen and accessed. The surface of the laptop slot (4) is lined with non-slip surface (3) to ease insertion and control of the laptop (42) as it is lowered into the slot (4). An adjustable front cover (15) defining the front boundary of the slot (4) covers the keyboard of the mobile computer (42) so that the user does not need to view two keyboards, and the appearance of the docked laptop (42) is clean and aesthetic. Wireless data and power transmission into the laptop (42) is provided while the laptop (42) is in the slot (4) so that the laptop (42) can be used in the docking station without a need for cable connections (45, 46) at all.

1 Claim, 10 Drawing Sheets

VERTICAL DOCKING STATION

This is related to U.S. Provisional Application No. 60/383,964 filed on May 28, 2002, entitled "Vertical Docking Station." It is also related to International Application No. PCT/US03/16418 field on May 22, 2003, and published on Dec. 11, 2003 as International Publication No. WO 03/103357, both applications entitled "Vertical Docking Station".

FIELD OF THE INVENTION

This invention pertains to a docking station for a mobile computer, such as a laptop, tablet pc, ultra portable, desktop replacement, that lifts the mobile computer screen to a more comfortable viewing position, and allows the mobile computer to be easily connected to a full size keyboard, mouse, printer, network, and other USB peripherals. In essence, the vertical docking station converts a mobile computer to a desktop workstation.

BACKGROUND OF THE INVENTION

A docking station is a hardware component that complements a mobile computing device, such as laptops, tablet pcs, ultra portables, desktop replacements and the like. Conventional docking devices for mobile computers are designed to connect directly to the mobile computer via ports on its back plane, or through a proprietary connector on the bottom of the mobile computer. Numerous approaches to docking stations have been tried in the past, with varying degrees of success.

A port replicator is a long device that pushes onto the back plane of the laptop. It simply extends the existing ports and when removing the laptop, the replicator remains connected to the cables of all the individual devices. This way, the user forgoes the need to connect these cables individually to the computer. However, the friction of connecting multiple ports can make this docking alternative difficult for the user, and the mobile computer and the dock need to be pushed together with proper alignment.

Some solutions include a proprietary docking port with very small pins that eases this connection. The port is usually at the bottom of the laptop. The docking surface is horizontal, and the connection is made by pushing the laptop onto the device. However, once again, most of these solutions assume the user will attach a second display, and the laptop display may not be used at all while docked.

Almost all docking stations position the portable computer parallel to the plane of the desktop working surface after physical connection to the dock, even though a full size auxiliary keyboard is used instead of the compact keyboard that is typically part of the laptop computer. Docking solutions that continue to use the laptop screen for viewing have the disadvantage that the laptop is in most cases connected on a horizontal plane relative to the desktop surface, and the laptop screen sits much lower than a traditional monitor when docked at the desktop, making the use of this docking solution very uncomfortable when used for an extended period of time. When a full size keyboard is connected, the laptop keyboard takes up space on the desktop between the docked keyboard and the laptop monitor.

Many docking stations and port replicators include a video port connection to a fixed monitor on the desktop surface. When the laptop is attached, the video signals are passed through either the laptop VGA connector or the proprietary docking connector to a full size monitor.

Many currently available external monitors now use LCD flat screens. This is the same technology used on laptop screens. Therefore, the necessity of the external monitor comes into question. Aside from the very small sub-notebook computers or the extra large screen requirements of graphics and design professionals, the external monitor brings little added value.

Most docking solutions are built for a specific mobile computing platform. They have a specific docking connector that works with a single laptop type. Furthermore, the power connection is also usually designed for single laptop. This means that every time the portable computing platform is changed, or a new model is introduced, a new docking solution must be procured. Even across single manufacturer's product lines, the docking solution is often specific to single model or group of models adding significant cost and inconvenience to the upgrade path.

An alternative is a universal approach that currently leans towards devices that perform a single or limited set of functions. This may include plugging in one device that creates a network connection and another that offers a serial port. This creates a need to use multiple 'docks' and inherently conflicts with many of the key benefits—ease of use, simplicity etc.

Another solution that is often used as a universal docking connection is a multi-port docking bar that connects the laptop via a Universal Serial Bus (USB) connection on the laptop computer. This sits loosely at the side or back of the laptop. Usually these devices connect the keyboard, mouse, parallel, serial, and ethernet ports via a single USB cable connection. A single USB connection docks the laptop. All of the cables are spread out on the desktop behind the laptop.

Current docking solutions include connections to the various peripherals on the rear of the dock. However, the cables simply extend out the back and on to the peripheral connection without a cable management solution. Most of the cables remain loosely arranged around the back of the docked laptop. Any cable management must be done with a separate device or with furniture.

However, a universal solution that adapts in dimension to fit the various shapes and sizes of laptops and uses a simple easy-to-use coherent docking approach is new to this industry. Furthermore, this innovation accomplishes the cable connections and positions the laptop for comfortable viewing. This advantage is greatly needed by the many users working longer than a few minutes per day on their portable computers.

SUMMARY OF THE INVENTION

A portable computer docking station in accordance with the invention provides a physical support and connection platform that facilitates quick and easy connection of a laptop computer to needed peripherals and the network at a user's workspace. The docking station places the laptop screen at a comfortable viewing position, and provides a facility for convenient component/cable storage and management. Also, it adapts in dimension to offer these advantages to portable computers of varying size and dimension.

This docking station acts as a digital hub and cable management platform as well as a laptop support designed to place the laptop screen in a comfortable viewing position relative to the working position of the user. The invention simplifies the user setup time and procedure when connecting the portable computer wherever their workspace may be located. Moreover, once the laptop is connected, the user feels much more comfortable with their working position relative to the laptop computer and its viewable screen area. Once the laptop is placed within this docking station, the position and height of the laptop can be adjusted by simple adjustments in the docking station to comfortably fit the end user viewing requirements.

In this docking station, the laptop is position almost perpendicular to the plane of the desktop surface, lifting the position of the screen upward into a good ergonomic position. The vertical docking station allows a full size keyboard without using extra desktop space because of the upright angle of the laptop computer.

One beneficial feature of a vertical dock in accordance with this invention is an upward orientation of the connectors when the laptop is in the slot in the docking station, thereby giving the users easy access to the place where they need to connect the power and USB cables to the laptop. It is very easy to connect cables to a surface that is directly in front of you.

The surface of the laptop slot is built with a non-slip surface to prevent the laptop from rapidly falling into the slot. The rubber feet or bottom surface of the laptop engages this non-slip surface while docking, so that the laptop slips smoothly and with easy control into the slot. The bottom of the slot also has a rubber surface to protect the laptop.

A cosmetic cover covers the keyboard of the mobile computer so that the user does not need to view two keyboards and the appearance of the docked laptop is clean and aesthetic. The cover is adjustable to fit the size of the particular laptop installed in the vertical docking station. The cosmetic cover can also be removed from the vertical dock for replacement with another color or simply to ease the setup of the laptop configuration.

If a second screen is desired this can also be connected. However, most users will have no need to use an external monitor as the laptop screen itself will suffice.

This invention offers a way to store and organize the multiple cables extending from the back of the laptop. The bay cleans up the desktop by offering a space to hold all the clutter of cables, connectors, and power bricks that accumulates behind a connected portable computer when associated with traditional docking solutions. The cable bay also has features of cable management that carry out two functions—storage of excess cables, connectors, etc. and the guidance of cables to positions where the users need the cables.

BRIEF DESCRIPTION OF THE DRAWINGS

The invention and its many features and advantages will becom better understood upon reading the detailed description of the preferred embodiments in conjunction with the following drawings, wherein.

DETAILED DESCRIPTION OF THE PREFERRED EMBODIMENT

Figure 1:
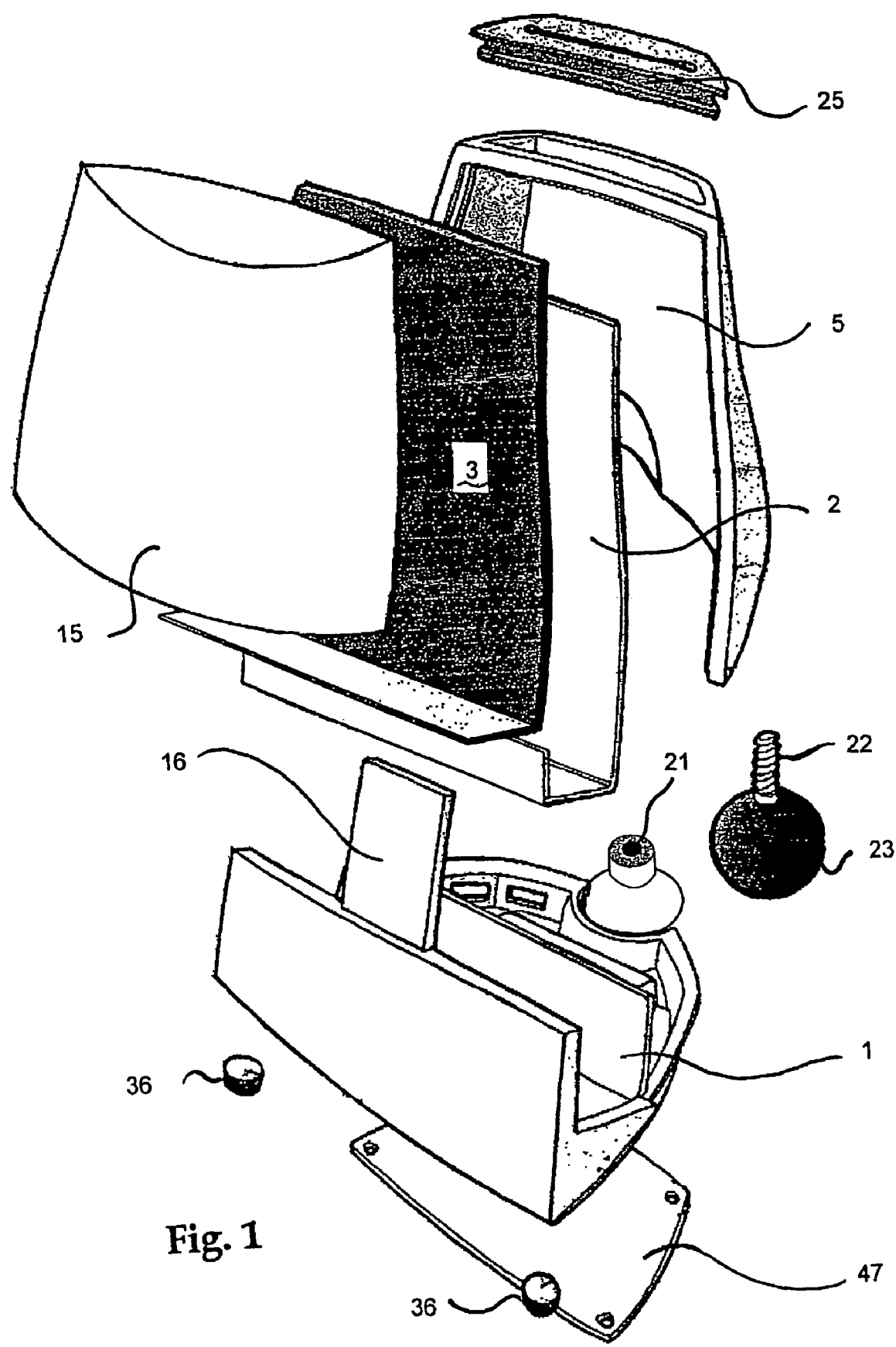
FIG. 1 is a simplified exploded view of a vertical docking station in accordance with the invention.
Figure 5:
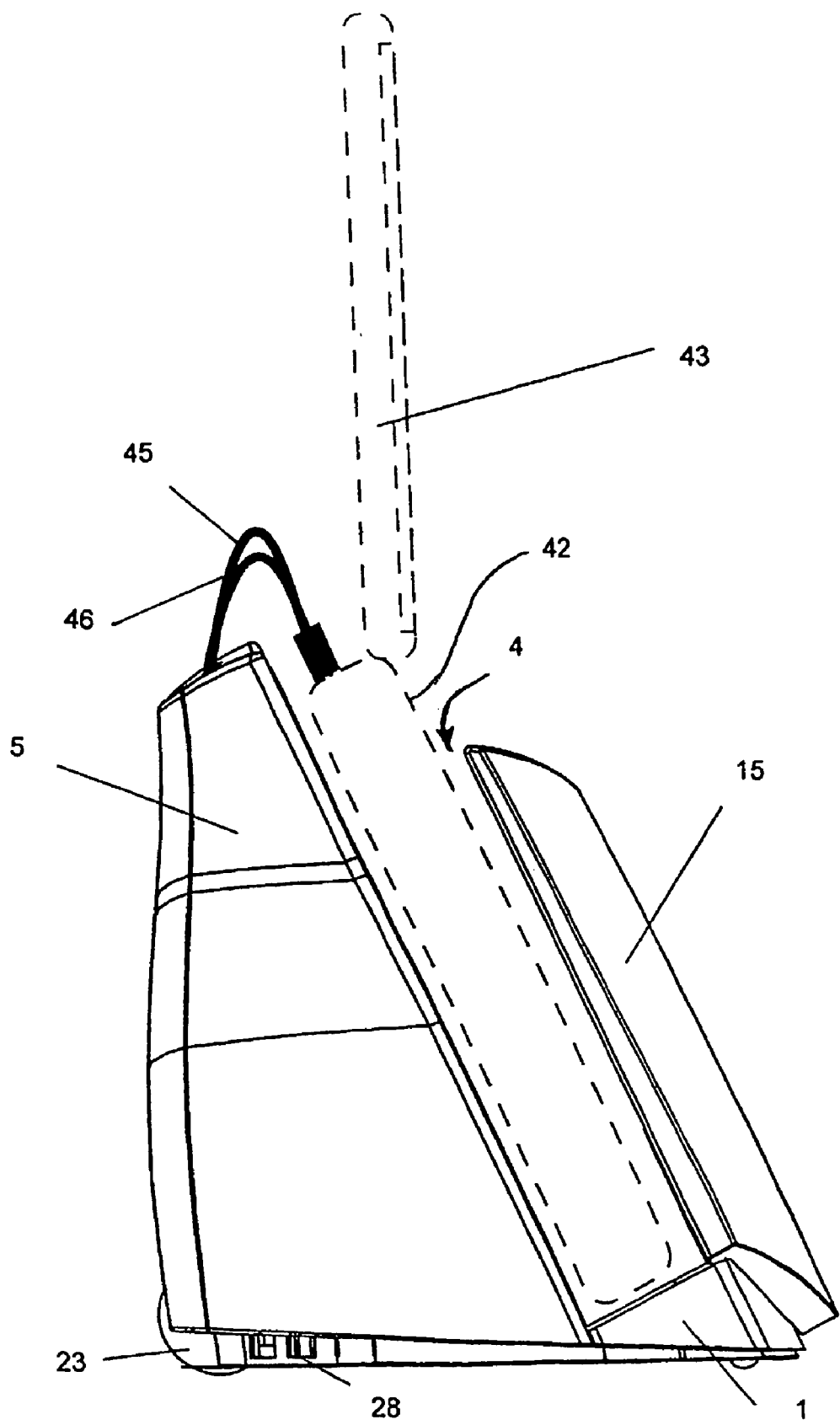
FIG. 5 is a side elevation of the docking station shown in FIG. 4, with the laptop computer shown in phantom.

Turning now to the drawings, wherein like reference numerals designate identical or corresponding parts, and more particularly to FIG. 1, an exploded view of a vertical docking station in accordance with the invention is shown having a dock base 1 to which is attached a laptop support plate 2. The laptop support plate 2 has an upturned front lip that defines, with the upright back surface, a vertical dock bay or slot 4 for receiving a laptop computer, as shown in FIG. 5. An anti-slip foam sheet 3 made of foamed Neoprene or some other suitable, preferably elastomeric, material is attached to the front of the upright and the lower support surfaces of the laptop support plate 2 to prevent slipping of the laptop computer and ease entry as it is loaded into the docking station. A metal sheet 47 covers the under surface of base 1, and rubber feet 36 attach to the bottom of the sheet 47.

A height adjustment ball 23 on a threaded post 22 is threaded into a tapped receptacle 21 on the rear of the base 1 for adjustment of the height and angle of the laptop screen. A sliding front cover 15 attaches to the base by sliding onto an I-section support 16 by way of a front cover sliding guide 17 (shown in FIG. 2) that attaches to the backside of the sliding front cover 15. A cable support rubber insert 27 having a slotted cable support membrane 25 is fitted into an opening in the top of a cable bay housing 5. A rabbit 48 around the front edge of the cable bay housing 5 receives the laptop support plate 2 to enclose the rear cable management and storage area between the cable bay housing 5 and the laptop support plate 2.

Figure 2:
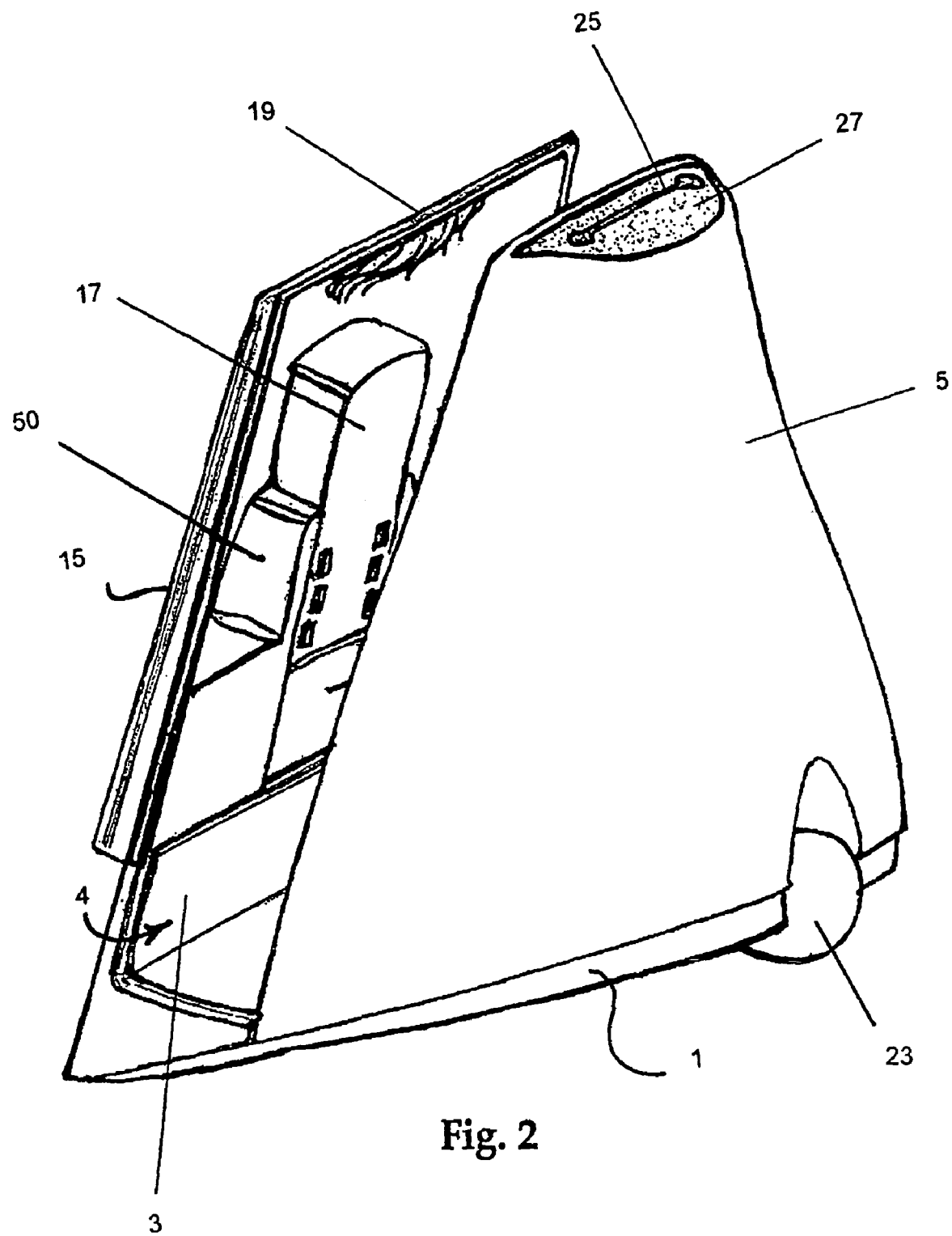
FIG. 2 is a rear isometric view of the docking station shown in FIG. 1.

The cable bay housing 5, shown in FIG. 2, is attached to the laptop support plate 2, and the height adjustment ball 23 is shown attached to the dock base 1. The front cover sliding guide 17 of the front cover 15 slides over the front cover I-section support 16 for vertical adjustment of the position of the front cover 15. The cover 15 can be stopped at any position along its sliding path. If the friction is not great enough to hold the cover in place anywhere along the sliding path, a friction screw 53 (shown in FIG. 8) can be tightened to adjust this friction.

The sliding front cover 15 of the vertical docking mechanism serves primarily as a cosmetic cover that adjusts to fit the dimensions of almost all laptops when they are loaded into the docking station. Users of the docking station will have preferences as to how much of the front of the laptop they want to cover. Moreover, the user can easily slide the cover to the exact position either covering or leaving exposed the laptop buttons near the laptop hinge region where most laptop manufacturers place the power switch, light emitting diode (LED) indicators, and sometimes even speakers. The cover also provides a flat surface that keeps the laptop front protected when inserted. This entire area works similarly to the pouch of a laptop carrying case. Covers may be easily swapped and easily removed in case the user needs access to the laptop keys during system setup, and covers of differing dimensions and sizes may be substituted to accommodate user tastes and sizes of different laptops.

The easy connection of the power and data cables to the laptop at loading into the docking station is facilitated by positioning cables in close proximity to the laptop ports for ready connection. A typical laptop use scenario involves pulling a power supply out of the bag and seeking a place to plug in and organize the tangle of cables on the desktop. The laptops may have a power cable on either side of the laptop. Therefore, the cable management needs to hold the cables securely in place on either side. The rubber insert 27 with slotted cable support membrane 25 allows the larger part of the cable to push through the slot yet maintains a clamp on the cable at the correct length for easy plug-in to the laptop computer. This function applies to any other cables the user may want to have handy such as a security cable or another data cable.

The cable bay rear housing 5 serves a similar purpose to the front cover. It encloses a cable bay within the cable bay housing 5 and provides storage space at the back of the docking station, facilitating clearance from the desktop of much of the clutter present with most docking mechanisms, and allowing easy access and organization of all these components. The cable bay holds power supplies, network adapters, wireless network and keyboard/mouse transceiver, wireless power supply and controls, and other sundry components and peripherals laptop users need and use on a daily basis, thereby eliminating the usual clutter around the laptop. As the USB hub consolidates the connection of most of these items, they can be connected and placed in the rear of the invention when cables are routed and connected. The housing 5 is designed to both enclose and allow cables to run from inside the docking station to outside while shielding the clutter within the back cable management bay. This design also allows the free movement of air from the base of the docking station up into the cable bay and out the top via the cable support slot 25. Vents or louvers (not shown) can also be provided in the cable bay housing for this purpose. This prevents the buildup of heat from the power supply. The housing 5 protrudes out over the dock base 1 allowing a space for both the cables to run and air to flow in and upward convection cooling the cable bay.

Figure 3:
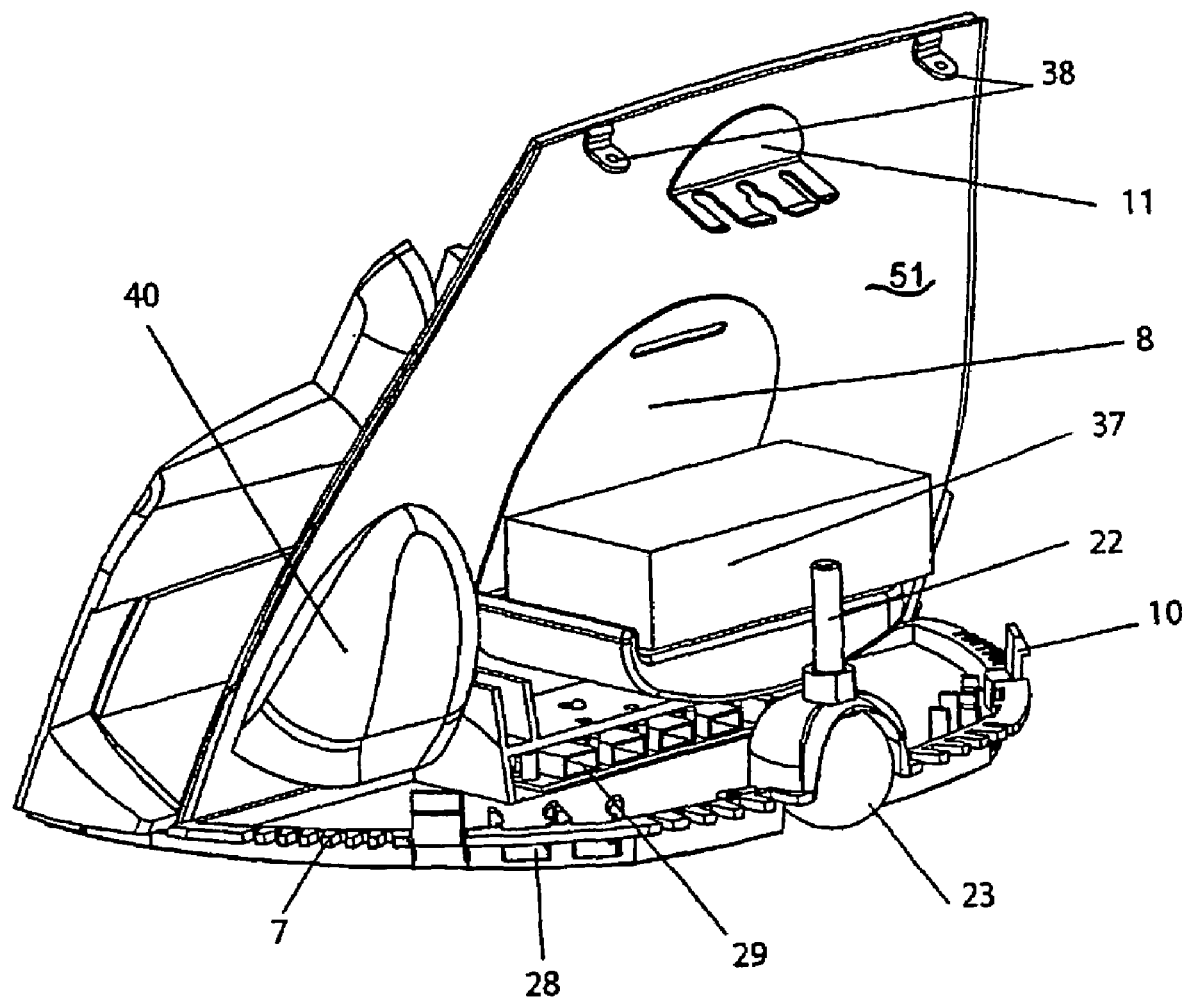
FIG. 3 is a rear isometric view of the docking station shown in FIG. 2, but with the rear housing removed to show the cable bay.

A cable port 28 provides both internal and external access via a flexport cable (not shown) to a USB hub 29, shown in FIG. 3. If the user decides to use a wireless keyboard and mouse, avoiding all cables external to the docking station, the flexport cable can simply be removed and the connection to the hub can be made internally. If the user wants to connect digital cameras or other items external to the vertical dock, the flexport cable brings the USB connection to the outside of the housing.

The laptop support plate 2 includes a mounting mechanism to hold the laptop power brick 37, power and data cables, and other wireless connections in a neat and organized manner, as shown in FIG. 3. Velcro connections hold some items in place while plastic holders connect other items. On the cable bay side of the laptop support plate 2 a hook-and-loop surface 51, such as Velcro, is attached to help organize all the items stored in this area. The surface may also include a series of holes for inserting plastic cable locks. A flex shelf power supply holder 8 with one surface having a Velcro hook surface will hold the power brick away from the rest of the items placed in the bay.

The anti slip support plate foam rubber sheet 3 allows the laptop to be placed into the docking mechanism without dropping quickly to the bottom of the enclosure. As the laptop is slid into the laptop holding bay, the friction between the back of the laptop and the foam on the vertical dock back plane engages the laptop, keeps it from quickly falling to the bottom of the slot, and makes it easy for the user to easily control it while guiding it into position. The bottom surface is also foam covered to further protect the laptop.

Figure 9:
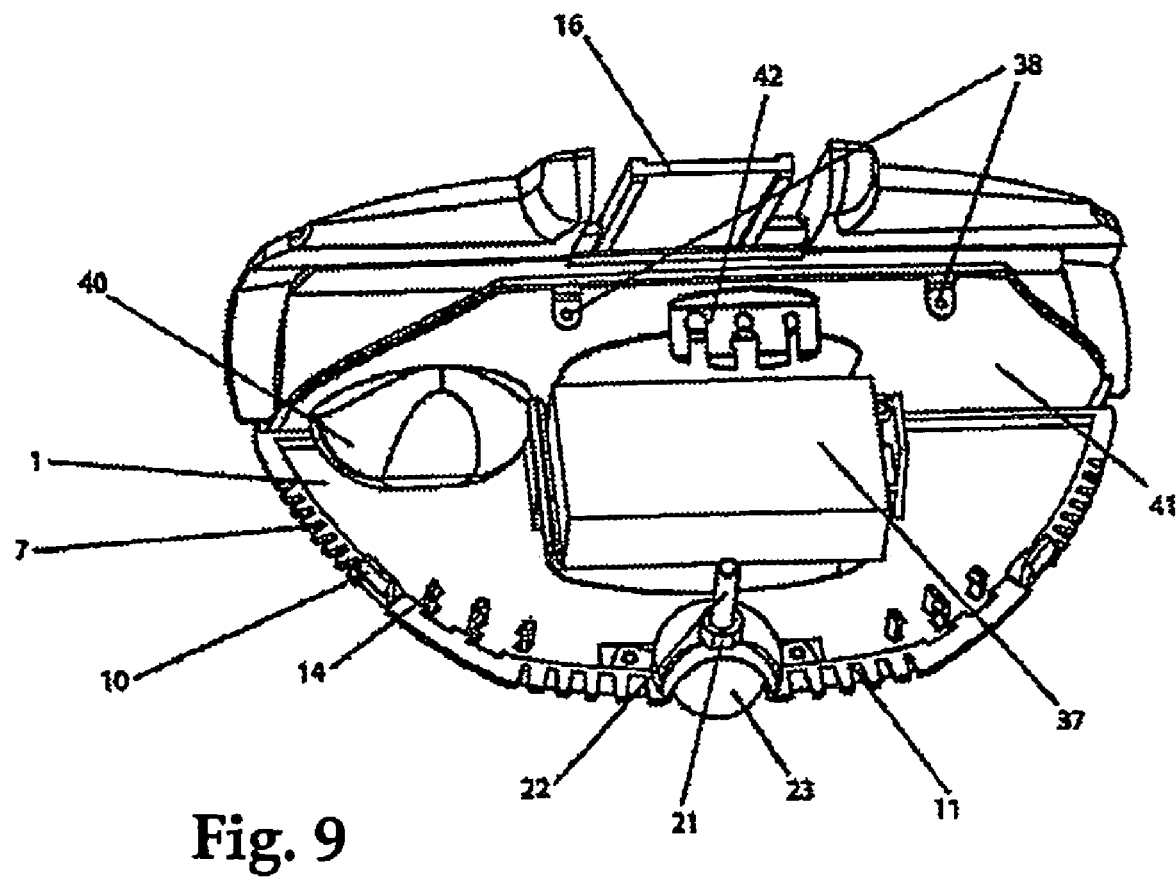
FIG. 9 is a plan view from the top of the docking station base shown in FIG. 3, showing the cable bay without loaded peripherals.

The components in the cable bay within the cable bay cover 5 include the laptop power supply brick 37, which rests on the flex shelf 8. This flex shelf attaches to the laptop support plate 2 because this plate is covered with Velcro backing adhesive 51. Cable lock down slots 11 are also attached via this Velcro material 51. A wireless peripheral transceiver 40 also attaches in the cable bay via the Velcro surface 51. The USB hub 29 slides into position at the base of the cable bay and allows the attachment of the USB peripherals in the cable bay. The cables exiting the cable bay 4 are pushed into the cable lock down slots 11 and the geometry of these slots hold them steady and out of the way so the cable bay housing 5 can be correctly attached to the base without the cables obstructing the connection. The cable bay housing release hooks 10 snap into the cable bay housing 5 and hold it in place. These release hooks 10 are pushed inward on both sides to release the cable bay housing 5. The cable bay housing 5 is ventilated in the closed position by all the openings already mentioned at the bottom as well as by cable bay air vents 7. In case the user wants to connect devices outside the cable bay, a flexport cable (not shown) can be snapped into flex port cable hold down posts 14 (shown in FIG. 9). This cable extends the USB hub connection from the inside of the cable bay to the outside. The cable bay housing 5 can be secured for security purposes by screws that attach to the cable bay housing lock tabs 38, although the housing stays in place without this extra security.

Figure 4:
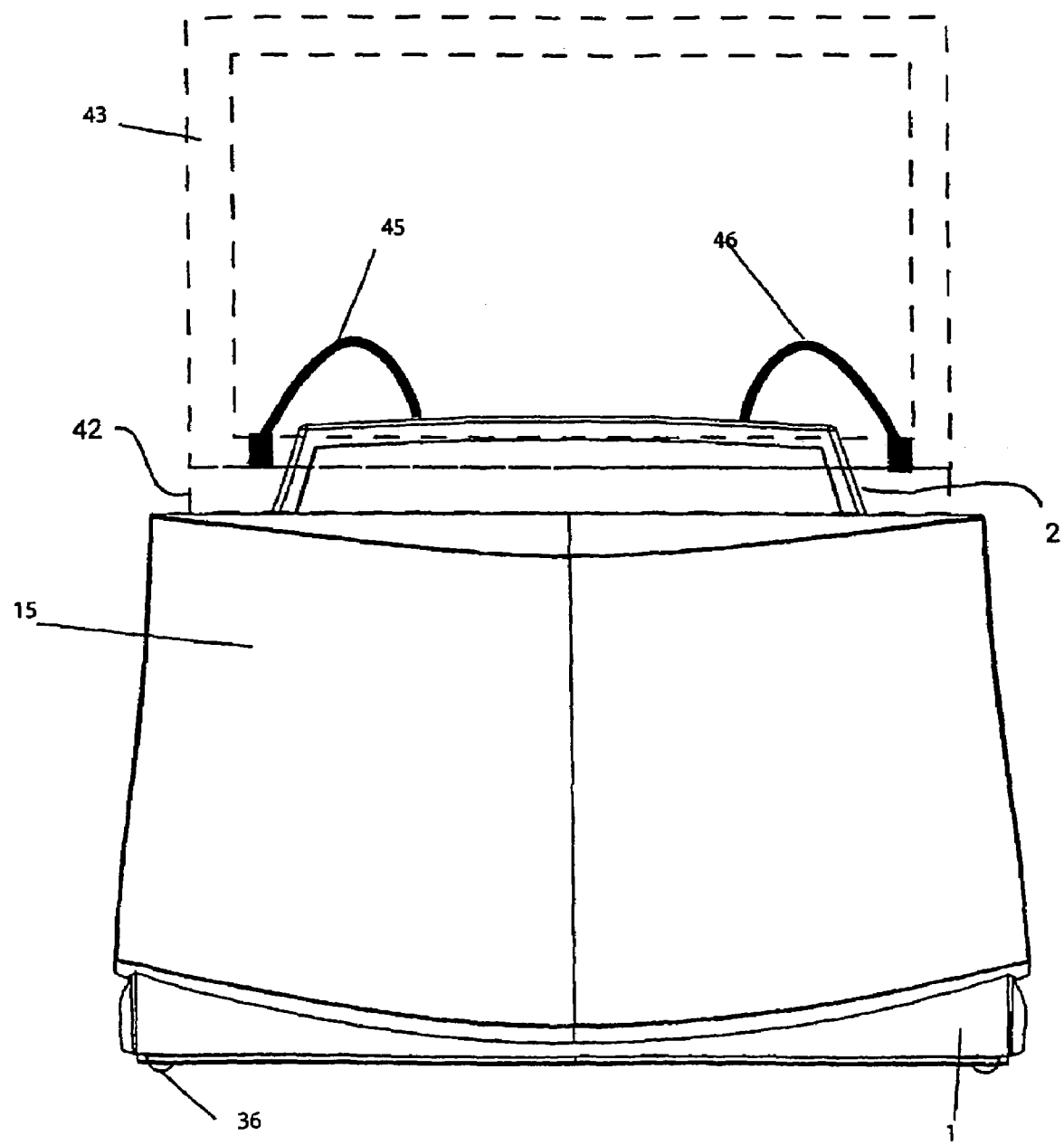
FIG. 4 is a front elevation of the docking station shown in FIG. 1, showing in phantom the position of the laptop computer when inserted into the docking station.

The lateral dimension of the upper region of the laptop support plate 2 is narrower than the lateral dimension of the laptop computer 42, as shown in FIG. 4, which facilitates easy insertion of the laptop 42 into and removal out of the slot 4. The USB hub data cable 45 and the power cable 46 to the laptop 42 are shown extending out of the cable support slot and connecting to the back surface of the laptop 42. The laptop screen 43 is shown in the upright position positioned for comfortable viewing. The sliding front cover 15 is shown covering the laptop keyboard. The non-slip rubber feet 36 are shown extending below the bottom surface of the dock base 1.

The USB hub data cable 45 and the power cable 46 to laptop are shown in FIG. 5 extending out of the cable support slot and connecting to the back surface of the laptop. The flexport cable port 28 is visible from this perspective and shows where external USB devices will be connected on the outside of the docking station. This may include a USB keyboard, mouse, or digital camera. The height adjustment ball 23 extends below the dock base 1 and will extend further if threaded downward from the height adjustment threaded receptacle 21, which is not visible in this view.

Figure 6:
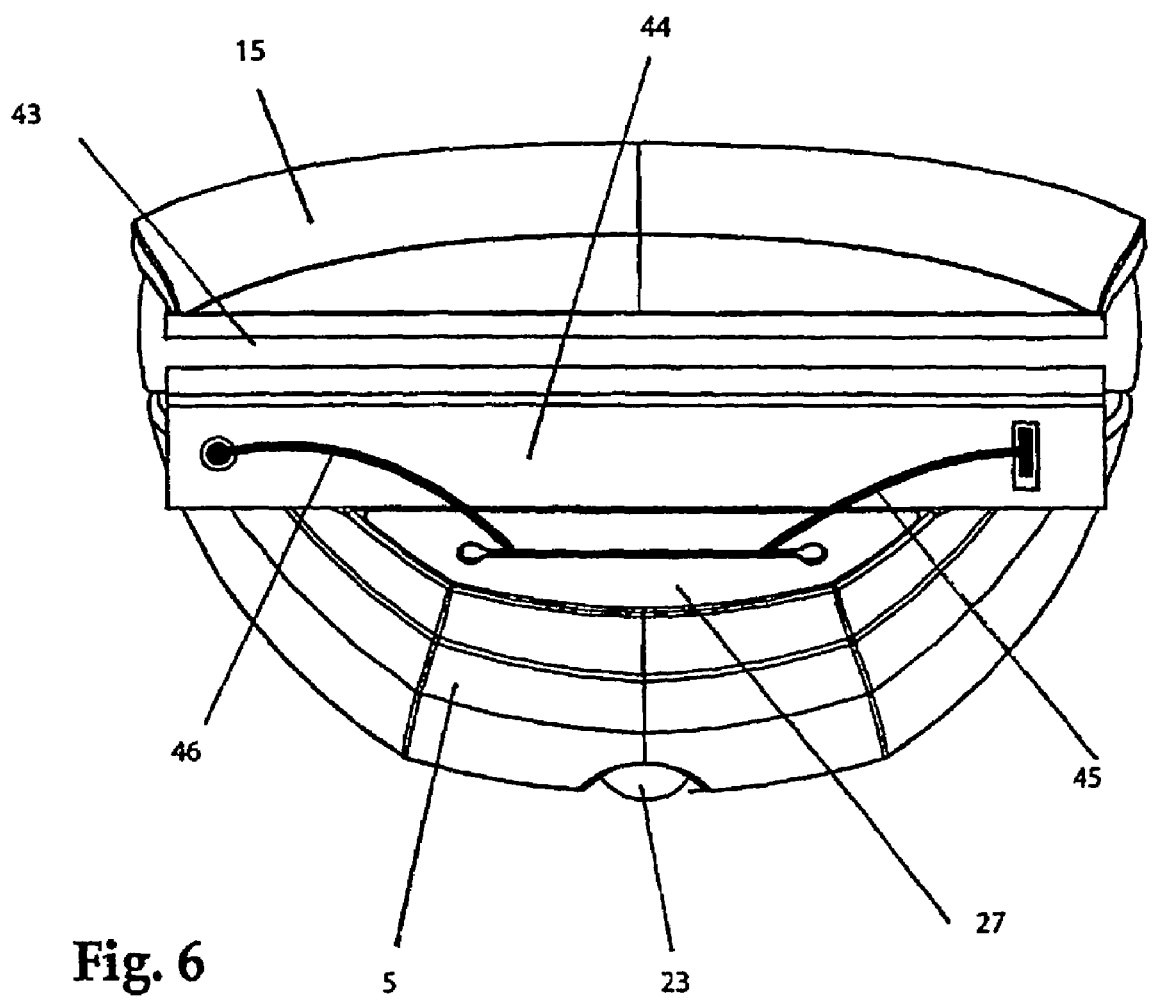
FIG. 6 is a top view of the vertical docking station shown in FIGS. 4 and 5, with the laptop computer inserted.

The slotted membrane 27 of the cable support insert 25, shown in FIG. 6, keeps the cables held in position so when the laptop is removed and then reinserted, the cables are held in the proper position ready to be easily reconnected.

Figure 7:
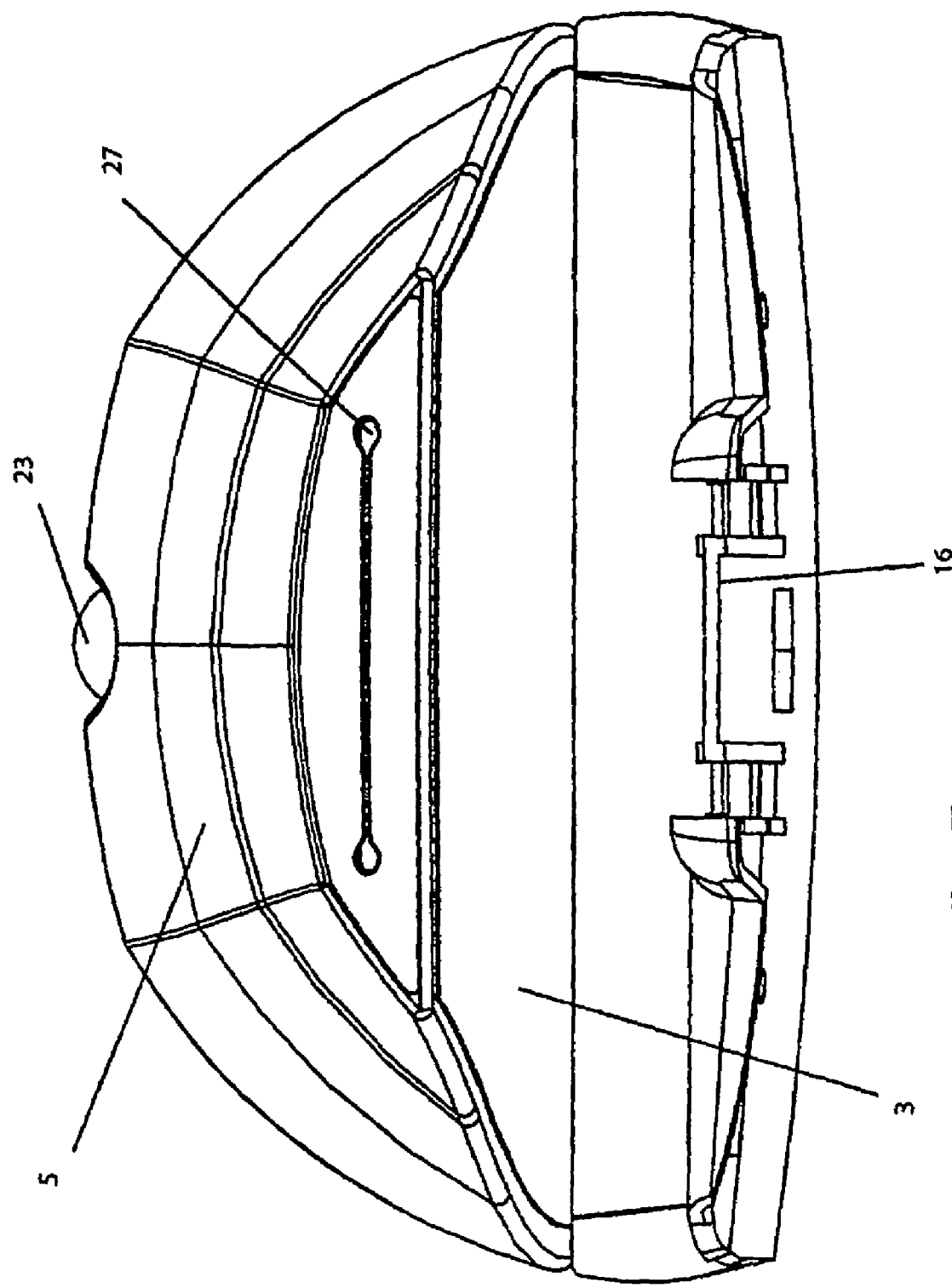
FIG. 7 is a plan view of the docking station shown in FIG. 2, looking down, with the front cover removed.

FIG. 7 shows a top view of the invention with the sliding front cover 15 removed. This view shows the shape and construction of the front cover I section support 16 and the slider guide that is adjacent to it.

Figure 8:
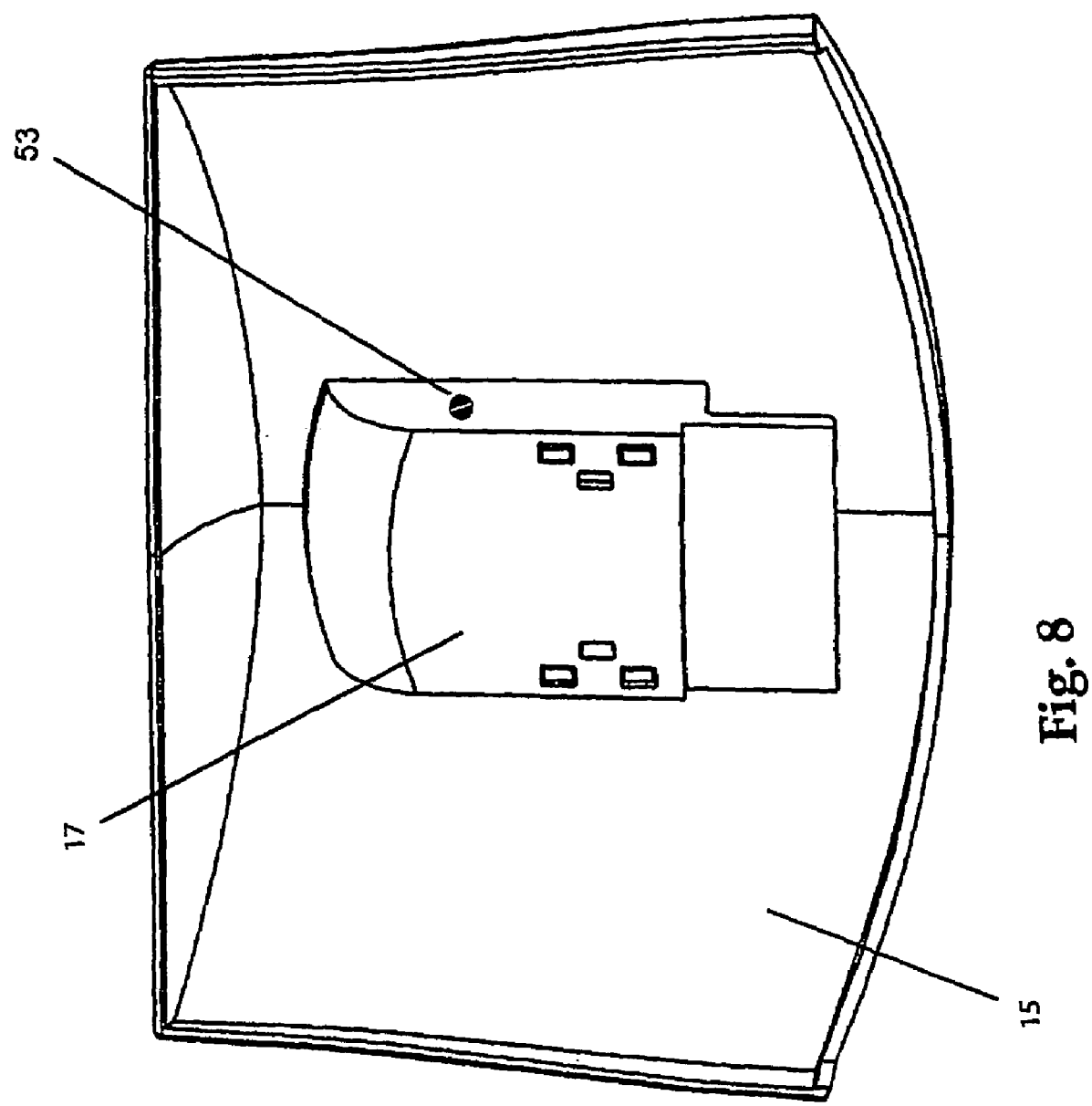
FIG. 8 is an elevation of the inside of the front cover on the docking station shown in FIG. 2.

The backside of the front cover 15, shown in FIG. 8, has the front cover sliding-guide 17 snap onto the front cover 15. In turn, this complete assembly slides over the front cover I-section support 16 that is visible in FIG. 7.

The vertical dock support plate 2 has a foam surface that both protects the laptop and keeps it from rapidly slipping to the bottom of the dock. An alternative configuration envisions a wireless power technology inside. The goal is to create a completely wireless docking solution. This means no wires to run the keyboard, no wires to interface with the network, and no wires to transfer power to the laptop and its battery. The technology of Bluetooth and 802.11 cover the first technologies and these will normally be incorporated into the laptop. Transfers will be held in the rear bay. The wireless power is another technology. The vertical dock lends itself to the application of wireless power because the support plate 2 can be embedded with technology to allow wireless power transfer to the laptop. The power from the support plate 2 of the vertical dock will transfer energy to the laptop from this surface. Two versions of this wireless power transfer are currently envisioned for this docking station.

Figure 10:
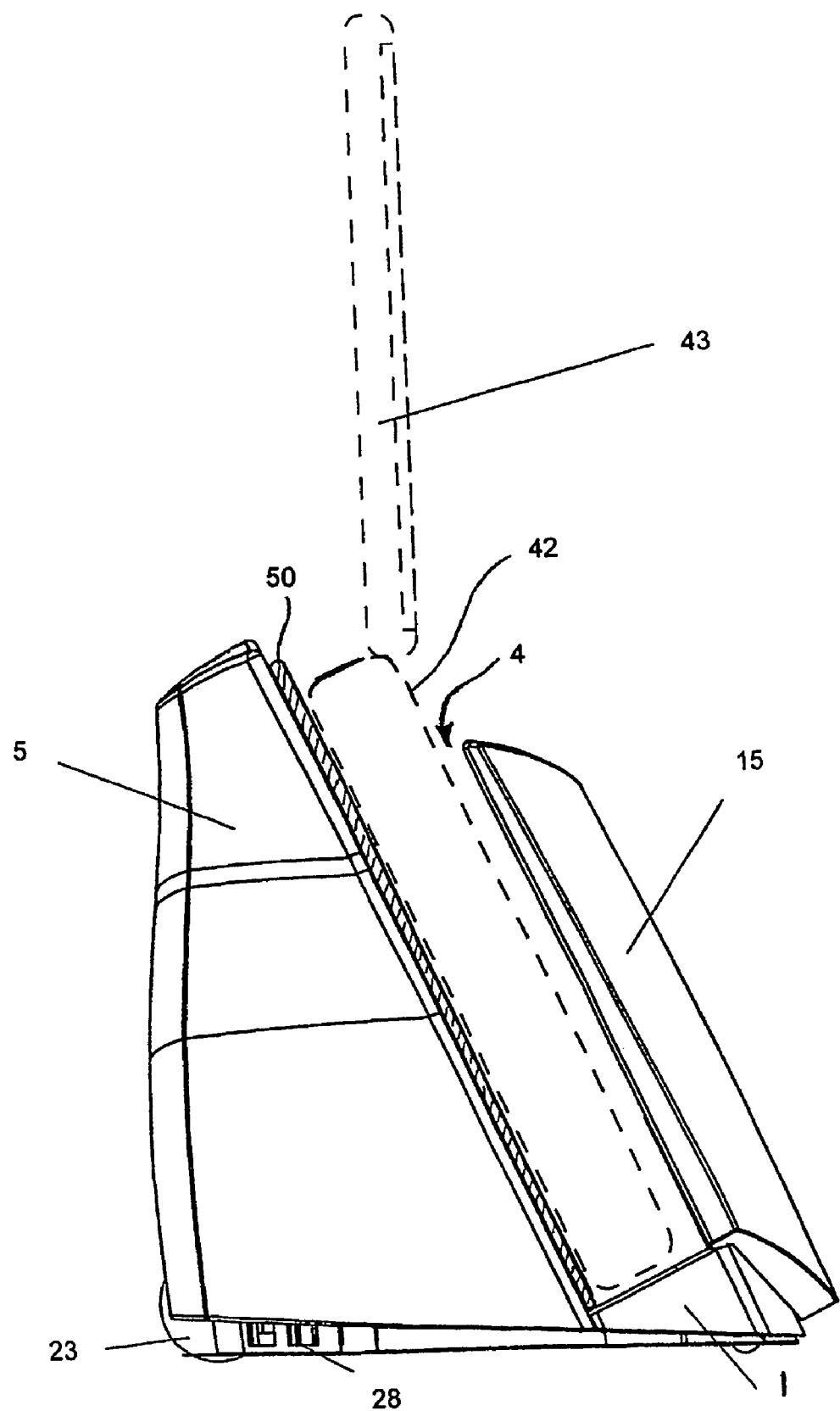
FIG. 10 is a side elevation of a wireless power embodiment of a docking station in accordance with this invention.

The first wireless power transfer embodiments, shown in FIG. 10, uses cable-free power transmission to the laptop 42 while it is in the slot 4 of the docking station, using a "power pad" 50 made by MobileWise in Los Altos, Calif., referred to by them as a Wire-Free Electricity Base. It connects to standard electrical outlets and comprises a pad with a grid of minute metal contact points. It can be bonded to the anti-slip foam sheet 3, or preferably, it can be incorporated into the anti-slip foam sheet 3 and serve both functions. A laptop placed in contact with the pad will automatically draw the correct amount of power from the pad's points to recharge its batteries. Electronic integrated circuits in the laptop communicate with chips installed in the Wire-Free Electricity Base to deliver the necessary power only to the points that are in contact with the laptop.

A second wireless power transfer embodiment of the docking station uses induction to transfer power to the laptop. An inductive charger in the docking station is positioned adjacent to internal coils of a receiver in the laptop when it is properly positioned in the slot 4. This scheme does not require any contact at all, unlike the "power pad" approach. The components for remote power transmission using this scheme are available from SplashPower in Cambridge, England.

Obviously, numerous other modifications, combinations and variations of the preferred embodiments described above are possible and will become apparent to those skilled in the art in light of this specification. Moreover, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein I claim:

I claim:

1. A process for supporting a laptop computer for use on a work surface with an auxiliary keyboard, while concealing an integral keyboard of said laptop and presenting a folding screen of said laptop at a selected ergonomic upright viewing angle, comprising:

inserting said laptop computer into a slot defined between a rear support plate and a front cover, said slot being open on three sides and closed on a fourth side;

catching and supporting said laptop on an elastomeric end pad at said closed side of said slot when said laptop is inserted into said slot:

adjusting said upright angle of said slot relative to said supporting surface to a desired upright angle for viewing said screen by rotating said front cover and said rear support plate relative to said work surface;

said adjusting step includes adjusting an adjustable foot on one edge of said base to change the elevation of said one edge of said base relative to said work surface and thereby rotate said front cover and said rear support plate relative to said work surface.

* * * * *